Aug. 20, 1974     H. SCHARFMAN     3,830,945
METHOD AND APPARATUS FOR PROCESSING EGGS WITH MICROWAVE ENERGY
Filed Dec. 8, 1972
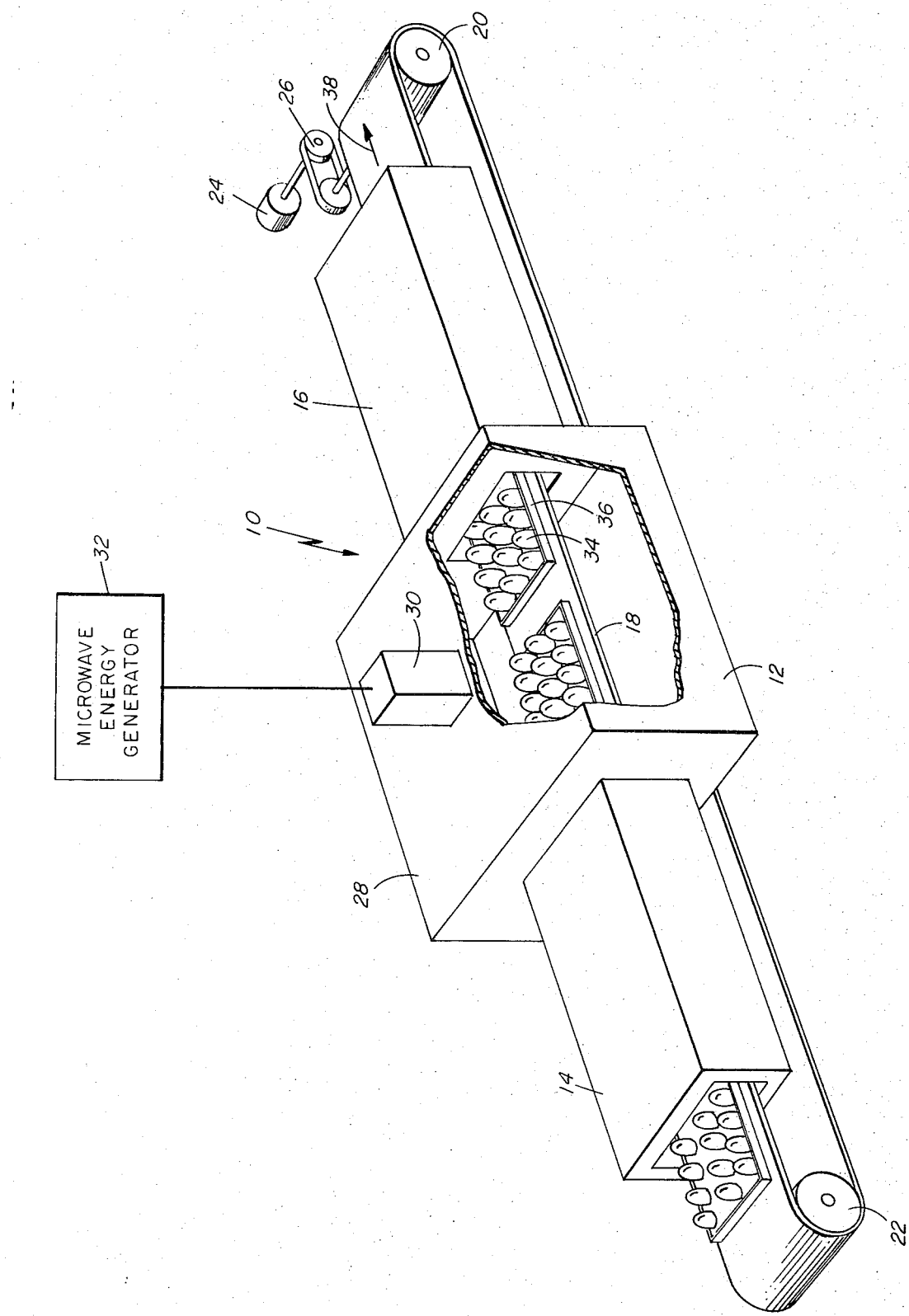

United States Patent Office 3,830,945
Patented Aug. 20, 1974

3,830,945
METHOD AND APPARATUS FOR PROCESSING EGGS WITH MICROWAVE ENERGY
Howard Scharfman, Lexington, Mass., assignors to Raytheon Company, Lexington, Mass.
Filed Dec. 8, 1972, Ser. No. 313,320
Int. Cl. A23l 1/32
U.S. Cl. 426—243                             6 Claims

ABSTRACT OF THE DISCLOSURE

A method of and means for cooking and sterilizing is disclosed involving the application of microwave energy to complete processes of food products in the precooked state. Continuous transport of the product being treated is provided by means of a conveyorized system.

(1) Field of the Invention

The invention relates to microwave heating apparatus and, more particularly, to cooking and sterilization of shell eggs.

(2) Description of the Prior Art

Numerous foods are now processed utilizing microwave energy launched within an applicator. Fast processing times, cleanliness, comparatively low cost and in absence of high temperatures during the operation make microwave heating a desirable processing technique. For the purposes of the present specification, the term "microwave" refers to energy in the electromagnetic spectrum having wavelengths in order of 1 meter to 1 millimeter and frequencies in excess of 300 mHz. The energy generators most commonly employed in such applicators are the magnetron or high power triode tubes. The assigned frequencies of operation allocated by Federal and State regulatory bodies are 915 and 2450 mHz.

In the domestic and industrial food industry a need arises for hard boiled eggs which are ofen stored for extended periods of time. In order to assure complete cooking of the egg yolk center and prevent formation of soft pockets where bacteria may survive, it is necessary to thoroughly coagulate the egg meat. The temperatures at which the egg meat usually coagulates is typically in excess of 140° F. In prior art processing shell eggs are commonly boiled in water for long periods to hard cook them, illustratively, in the order of 18 to 20 minutes. It is possible however, that even with the continuous boiling some yolks develop a semi-hardened spot and over extended shelf life substantially bacteria cultures can develop.

In addition to the foregoing sterilization problem prior art boiling techniques result in a discoloration in the egg yolk and white interface region which resembles a green mold. Hence, a new improved method and apparatus for preparation of food products is desirable which not only assures thorough cooking but sterilization as well in, particularly, the center regions to achieve complete coagulation.

SUMMARY OF THE PRESENT INVENTION

In accordance with the present invention a food product is precooked by such methods as boiling up to a predetermined point before complete coagulation is accomplished. In the instance of shell eggs a temperature of approximately 110° F. in the partial cooking cycle is achieved by boiling for a time period in the order of 5–15 minutes. Steam baths may also be utilized. The egg white, as well as a considerable portion of the center yolk will become heated by conduction. Microwave energy in the order of several hundred to a few kilowatts is then applied for a relatively short period of time, illustratively, a few to ten seconds to thoroughly cook the egg meat with temperatures rising in excess of the approximate coagulation temperature of 140° F. A firm product with little or no green interface discoloration and complete coagulation as well as sterilization results from the described process.

Alternatively, after a shorter partial precooking period eggs are cooled and shelled before the application of the microwave energy. In such a process the shell eggs may be cooked for approximately 5–10 minutes by boiling and are then cooled and shelled. The application of a higher level of microwave energy for example approximately 1 kilowatt for a period of approximately 10 seconds then completes the hard cooking and sterilization.

The precooking of a food product by prior art thermal energy conduction processes is believed to change the dielectric constant characteristic of the material from the original state value. To compensate for poor thermal distributions by the heat conduction techniques, the application of microwave energy in the final stage results in little if any cooking in the outer layers which have a favorable admittance characteristic to allow microwave energy to pass through to the center area which is raw. The result then is a completion of cooking by absorption of the microwave energy rather than thermal conduction. This substantially eliminates overcooking leading to product damage and discoloration. The invention and its intended benefits are equally applicable to meat, vegetables or other food products which require complete cooking and sterilization due to periods of storage prior to usage.

DESCRIPTION OF THE PREFERRED EMBODIMENT

Referring to the figure, the illustrative microwave heating apparatus comprises applicator 10 having a hollow enlarged oven chamber 12 formed by substantially parallel conductive wall members. Means for the introduction and removal of a product include entrance waveguide tunnel means 14 and exit means 16 extending from opposing sides of chamber 12. The food products are transported through the microwave energy applicator by means of a conveyor belt 18 of a nonmetallic material carried by drums 20 and 22. Drum 20 provides the driving means and is actuated by motor 24 suitably geared by mechanism 26.

Microwave energy at either 915 or 2450 mHz. radiates chamber 12 through a suitable opening in top wall 28 and a launching waveguide section 30. The energy source, such as a magnetron, together with all the electrical, timing and safety controls is indicated generally by box 32. In view of the fact that the specific details of the microwave energy source are considered to be well-known in the art no further specific details are required for the understanding of the invention.

In accordance with one embodiment of the invention a plurality of precooked shell eggs 34 are transported by compartmentalized carrier means 36 which are also of a nonelectrically conductive material composition. Microwave energy of several hundred watts radiates the eggs in the chamber 12 for a period of time sufficient to elevate the internal temperatures above the coagulation point of 140° F. It is also possible in the practice of the invention to provide for the partial cooking of the shell eggs 34 in the waveguide tunnel 14 by a steam bath or running the conveyor belt through a tank of boiling water for the required precooking times, illustratively 5–15 minutes. Alternatively, in those embodiments where the food product is precooked, cooled, shelled and then heated by microwave energy, a shelling station can be inserted in the entrance means before passage through the applicator 10.

There is thus disclosed a method and apparatus for achieving a thoroughly cooked and sterilized food product in a relatively short period. The application of microwave energy assures a more pleasing appearance of the product by elimination of overcooking by prior art thermal conduction processing together with the benefits of sterilization. In view of the variations, modifications and alterations which will be evident to those skilled in the art, it is intended that the foregoing detailed description be accorded a broad interpretation.

What is claimed is:

1. A method of processing shell eggs comprising the steps of:
   precooking with thermal energy the egg to a predetermined temperature below that required for complete coagulation of the egg meat; and
   heating with microwave energy said precooked egg to a temperature sufficient for complete coagulation of the egg meat.

2. The method according to claim 1 wherein said shell egg is precooked to a center temperature in the order of approximately 110° F.

3. The method according to claim 1 wherein the temperature for complete coagulation is in excess of 140° F.

4. A method of processing shell eggs comprising the steps of:
   precooking with thermal energy the egg to a predetermined temperature below that required for complete coagulation of the egg meat;
   cooling said egg;
   removing the outer shell; and
   heating with microwave energy said shelled egg to a temperature sufficient for complete coagulation of the egg meat.

5. A method of processing shell eggs comprising the steps of:
   precooking with thermal energy the egg for a period in the order of five to twenty minutes; and
   heating with microwave energy said precooked egg for a period in the order of two to ten seconds.

6. A method of processing shell eggs comprising the steps of:
   precooking with thermal energy the egg for a period in the order of five to ten minutes;
   cooling said egg;
   removing the outer shell; and
   heating with microwave energy said shelled eggs for a period of approximately ten seconds.

References Cited

UNITED STATES PATENTS

| | | | |
|---|---|---|---|
| 3,674,504 | 7/1972 | Lane | 99—107 |
| 3,494,723 | 2/1970 | Gray | 99—221 |
| 2,473,041 | 6/1949 | Urbain et al. | 99—221 |

A. LOUIS MONACELL, Primary Examiner

R. A. YONCOSKIE, Assistant Examiner

U.S. Cl. X.R.

426—298, 520